Aug. 4, 1970

H. G. ROGERS 3,522,985

HIGH-TRANSMISSION LIGHT POLARIZER

Filed Oct. 23, 1965

INVENTOR.
HOWARD G. ROGERS

BY

BROWN and MIKULKA

ATTORNEYS

United States Patent Office 3,522,985
Patented Aug. 4, 1970

3,522,985
HIGH-TRANSMISSION LIGHT POLARIZER
Howard G. Rogers, Weston, Mass., assignor to Polaroid Corporation, Cambridge, Mass., a corporation of Delaware
Filed Oct. 23, 1965, Ser. No. 503,016
Int. Cl. G02b 5/30, 27/00
U.S. Cl. 350—157                                    10 Claims

ABSTRACT OF THE DISCLOSURE

A laminated light polarizing device which transforms unpolarized light into polarized light with negligible loss. A retardation layer rotates the polarization of light after it passes through a first pair of isotropic and birefringent layers having a lenticulated interface and before it passes a second such pair. The lenticulated interfaced layers and the retardation layer are arranged so they work in concert to separate the light into ordinary and extraordinary components. Subsequent retardation elements and a lenticular surface are employed at the exit face to rotate the orthogonal polarizations to a common plane of polarization and recollimate the light.

---

Figure 1:
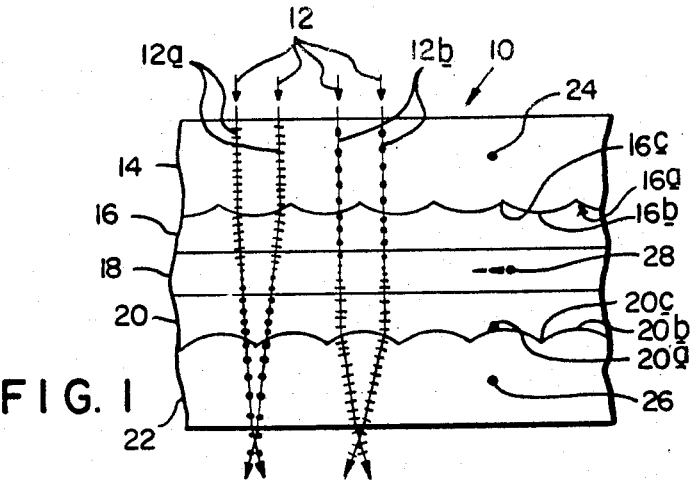

This invention relates to a composite light polarizing device which transmits an exceptionally large proportion of the light incident thereon.

It is characteristic of the usual commercial sheet polarizer, in which a stain or dye is incorporated in a molecularly oriented light transmitting material, or in a material comprising oriented minute crystals, or in a material involving some other type of orientation, that losses through absorption in excess of one-half of the incident light accompany performance of the polarizing function. Such losses are generally undesirable and may prove to be a serious detriment where it is either impractical or impossible to increase the intensity of the light source to balance them.

While light polarizers other than the types above-mentioned and offering improved transmission characteristics have been developed such, for example, as the so-called interference polarizers and those comprising certain arrangements of refracting, doubly-refracting, lenticular, reflecting and retardation components, none of these latter forms has, as far as the evidence goes, been particularly efficient or found employment on a commercial basis. Thus, for example, in U.S. Pat. No. 2,180,114 there has been disclosed a structure in which a birefringent layer produces, relative to an incident collimated light beam, certain undeviated ray components in the same direction as that of the entering beam and other components which are diffused in various directions. A positive lenticular surface, located next to the birefringent layer, focuses the undeviated components on a plurality of half-wave retardation elements, located in an adjacent layer, to rotate their vibration direction so that it is similar to that of the diffused components. However, certain disadvantages exist in such a system, including the fact that in intentionally changing the vibration directions of the focused components, a portion of the diffused rays is also transmitted by the retardation elements and its polarizing direction is undesirably rotated also. Thus, the nonuniformity of the two components is perpetuated rather than corrected and the operational polarizing efficiency is impaired. Furthermore, there is not complete collimation of the transmitted rays. Again, the structures involve a very small angular aperture so that incident light rays which are not collimated would not be focused on the retardation strips and proper operation would be seriously impaired.

The light polarizing devices of the present invention incorporate lenticular, isotropic, doubly-refracting and retardation elements but distinguish structurally and functionally from those above mentioned, particularly as brought about by a carefully-calculated and selective matching and mismatching of refractive indices of the respective layers, and are characterized by a generally improved light polarizing efficiency. The light polarizers described herein are adapted to production methods of manufacture and may be provided on an economical basis in a convenient sheet- or film-like form of reasonably large area. They are believed to have particular utility in systems wherein a high degree of polarized light is required but where a high intensity light source is disadvantageous. Because of their improved transmission properties it is possible, in such instances, to use an accompanying light source of a lower rating than would otherwise be possible. Furthermore, by avoiding the inclusion of a dye or stain, stability is enhanced and there is no possibility of operational impairment through leaching or other dissipation of a dichroic substance. Uses of the type contemplated for the subject light polarizers included anti-glare headlamp systems for vehicles, monoscopic and stereoscopic projection systems, polarized illumination, etc.

Accordingly, an object of the present invention is to provide a novel multilayer light polarizing device of high efficiency and wide utility which converts a large percentage of the incident light to polarized light and transmits it with substantially unreduced intensity.

Other objects are to provide a light polarizer of the character described wherein the layers have given selectively-interrelated refractive indices essential to its operation; to provide a light polarizer of the aforesaid category which may be in the form either of a rigid or a flexible sheet material; to provide such a light polarizer which is adapted to be readily manufactured on an economical basis; to provide a polarizing device through a novel combination of elements comprising isotropic, doubly-refracting, lenticular and retardation elements; and to provide a light polarizing material of the character described which is particularly adapted to usage in automotive lighting systems wherein reduction of glare is a desired factor, as well as projection or other illumination systems involving a polarized light.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIG. 1 is a diagrammatic, fragmentary, edge view of a light polarizing material or device of the present invention illustrating the transmission of light rays therethrough; and FIGS. 2 through 5 are diagrammatic, fragmentary, edge views of modifications of the light polarizing material of the invention.

As hereinbefore intimated, the present invention is primarily concerned with the end problem of providing, in practical and efficient form, what may be termed a high-transmission light polarizer, namely, one which is particularly adapted to polarize a very large portion of incident light, for use in equipment such as may be employed in a polarizing headlamp and viewing-visor system for automobiles, or for projection and other illumination purposes. The several structural examples of the light polarizing materials described herein permit a certain degree of latitude as to the nature of the light beams which undergo polarization. Thus, for example, although not limited to use therewith, collimated light beams may be provided by supplementary means or by means incorporated with the light polarizing sheet material itself, as shown in my copending U.S. patent application, Ser. No. 168,398, now U.S. Pat. No. 3,213,753 to be reissued Dec. 17, 1968 as U.S. Reissue Pat No. 26,506 filed Jan. 24, 1962. The beams are converted to polarized rays of substantially undiminished intensity, any loss of light being essentially limited to a relatively minor amount occurring at the abutting or tangential edges of elongated lenticular elements of the polarizing device. The transmitted polarized light may be in the form of either collimated or non-collimated rays as desired, depending upon structural characteristics of the sheet material, to be described. Again, the transmitted rays may either be linearly polarized and vibrating in a single given azimuth, or vibrating in predetermined different directions. When used with a properly-oriented quarter-wave plate (not shown), located in a conventional manner at an exit surface, the emergent rays may be circularly polarized. With these general considerations in mind, the specific structures of the invention will now be described in detail.

In FIG. 1 there is shown, in considerably exaggerated dimensions, a fragment of a light polarizing sheet material 10 as it would appear in elevation, namely, as viewed along a given edge. In order of arrangement with respect to the direction of a collimated beam 12 from a light source (not shown) the material is composed of a birefringent layer 14, an isotropic or at least functionally isotropic layer 16 having a relatively low index of refraction, a half-wave retardation layer 18, a second isotropic layer 20 identical to layer 16, and a second birefringent layer 22 identical to layer 14, the layers preferably being laminated or bonded together to form a unitary structure. It is not essential to operability to have the layers thus bonded, however, provided that the facing layer-surfaces enclosing an air layer are in parallel relation. The lower index of refraction of both birefringent layers 14 and 22 matches the refractive index of isotropic layers 16 and 20. For purposes of illustration, the two indices of refraction of each birefringent layer may be taken as approximately 1.5 and 1.7 and the index of each isotropic layer as approximately 1.5. The layers 14 and 22 have optic axes 24 and 26, respectively, disposed parallel to the plane of the sheet material 10 and in a direction normal to the surface of the paper. The optic axis 28 of the half-wave retardation layer 18 is disposed parallel to the plane of the sheet material 10 and substantially at 45° to the optic axes 24 and 26.

The interface 16a between layers 14 and 16 and the interface 20a between layers 20 and 22 are composed of a plurality of elongated, lens-like or lenticular elements 16b and 20b, respectively. The lenticules 16b and 20b extend across the entire area of the material in a direction normal to the surface of the paper, each pair thus being joined along a line 16c or 20c extending in a similar direction, the joining lines being parallel. The lenticules 16b and 20b are to be understood as actually of a size permitting a side-by-side arrangement of as many as several hundred to the inch. Their chosen size, spherical or aspherical curvature, relative disposition and positive or negative form are dependent upon considerations relating to the required paths and focusing of light-ray components. As shown, the curvature of the lenticules of interfaces 16a and 20a is relatively similar. The lenticules of the two interfaces are offset with respect to one another, the vertices of the lenticules of one interface being optically aligned with the longitudinal interconnecting edges of those of the other interface.

A certain degree of latitude is possible as to the choice of materials employed in forming the several layers. Thus, for example, layers 16 and 20 may suitably be composed of an isotropic plastic material as, for example, a methacrylate such as cyclohexylmethacrylate, having a refractive index of 1.52. Layers 14 and 22 may, appropriately, be composed of a plastic material as, for instance, of polyethylene terephthalate which has been rendered birefringent. A readily obtainable material of this composition, having refractive indices of 1.52 and 1.78 when thus rendered birefringent is one having the trade name "Mylar," sold by E. I. du Pont de Nemours Co., Wilmington, Del., U.S.A. Layer 18 may suitably be composed of cellulose nitrate which has undergone stretching in a known manner to provide a 45° molecular orientation therewithin.

One method of constructing the polarizing device 10 is to preform the birefringent elements 14 and 22, applying the isotropic layers 16 and 20 to the central half-wave plate 18 as a coating, such as a so-called "hot-melt," and placing the birefringent layers 14 and 22 against the layers 16 and 20, applying such compression as may be necessary to cause the outer surfaces of the latter layers to conform to the lenticulated surfaces 16b and 20b and adhere thereto at the interfaces 16a and 20a.

A process for forming the layers 14 and 22 to provide both the birefringence and lenticulated surfaces essential thereto includes the steps of stretching, for example, in the presence of heat or other softening agent, a sheet, of adequate thickness, of the aforementioned polyethylene terephthalate in the illustrated direction of the optic axes 24 and 26, while applying, compressively, a die having fluted configurations of the intended shape and size to a surface of the sheet. This surface is, of course, softened to a degree to render it adequately deformable. Assuming the stated indices of refraction, a birefringence of .2 may thus be established as a property of layers 14 and 22. A substance such as a silicone may, advantageously, be pre-coated on the die to serve as a lubricant and prevent its adhesion to the softened surface of the sheet. Another method contemplates the extrusion of the softened methacrylate from an orifice having a given fluted surface and a plane surface. The axial orientation and surface confiuration are provided substantially simultaneously by the foregoing methods. Other possible processes involve a sequential performance of embossing and orientation steps. As described, it will be noted that the lenticules 16b and 20b are generally cylindrical and that the optic axes 24 and 26 are disposed in parallel relation, a preferred although not unalterable condition. It is to be understood that appropriate subcoats may be applied to the respective components to facilitate bonding, where advisable.

The collimated beams 12, emanating, for example, from a light source and reflector and normally incident upon the doubly-refracting layer 14, are resolved thereby into two components, shown as separate rays, namely, an extraordinary or "E" ray 12a having, for example, the higher index 1.7 and an ordinary or "O" ray 12b having, for example, the lower index 1.5, the rays traveling in a similar direction but at different speeds and with their vibration azimuths relatively orthogonally disposed. The higher index rays 12a are convergently refracted at the interface 16a, it being recalled that the refractive index of isotropic layer 16 was given as 1.5. The rays 12b are undeviated at the interface 16a because their refractive index matches that of layer 16. The vibration directions or azimuths of both rays 12a and 12b are rotated or reversed during their transmittal by the half-wave retardation layer 18. Ray components 12a pass through isotropic layer 20 without deviation and straight through birefringent layer 22 by reason of the relation of their converted or assumed vibration direction to the optic axis 26. Ray components 12b also pass through isotropic layer 20 without deviation but are refracted at the interface 20a due to the relation of their assumed vibration directions to the optic axis 26. The orthogonally polarized ray components are focused at a focal plane adjacent to the exit face of the composite assembly. As described, the layers 14 and 22 are positively birefringent inasmuch as the refractice index of the "E" ray is represented as higher than that of the "O" ray, but a reverse condition is possible.

Figure 3:
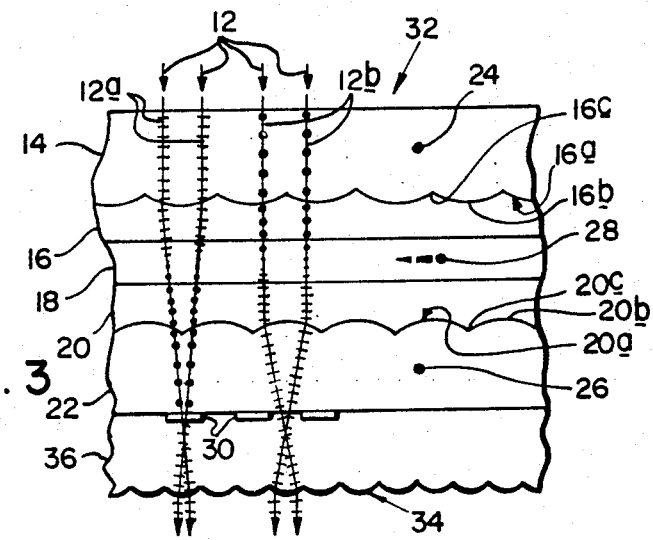

Either the "E" or the "O" ray, or both, may be selectively treated, as by passing them through retardation materials, to provide their vibrations in a single azimuth. Thus, in FIG. 2 a plurality of elongated half-wave retardation strips 30 are shown as bonded to the exit face of the polarizing device 31 so as to extend in a direction parallel to the lenticulations thereof, the device otherwise being similar to the composite sheet material 10 of FIG. 1. The strips 30 are so relatively spaced that ray components deviated at but one of the interfaces 16a and 20a pass therethrough, it being apparent that rays focused by either lenticulated interface may be chosen for interception by the retardation strips and rotation of their polarizing direction for the purpose of polarizing conformation. Alternatively, the retardation strips 30 may be supplanted by quarter-wave retardation strips positioned similarly to the elements 30 and, additionally, in the spaces therebetween so as to intercept all of the emergent rays. The quarter-wave strips have optic axes which are relatively orthogonally disposed and which are at 45° to the optic axis 26.

Wherein it is required to provide collimated emergent ray components, means for the purpose is illustrated in the device 32 of FIG. 3 in the form of a convergently lenticulated exit surface 34 of an isotropic layer 36. While the composite assembly 32 is shown as also including the retardation elements 30, it will be understood that their inclusion is optional and that the lenticular surface 34 could be incorporated with the device of FIG. 1. In such a modification it would also be possible to provide a lenticular surface directly on the layer 22 employing either positively- or negatively-refracting elements for the purpose.

Figure 4:
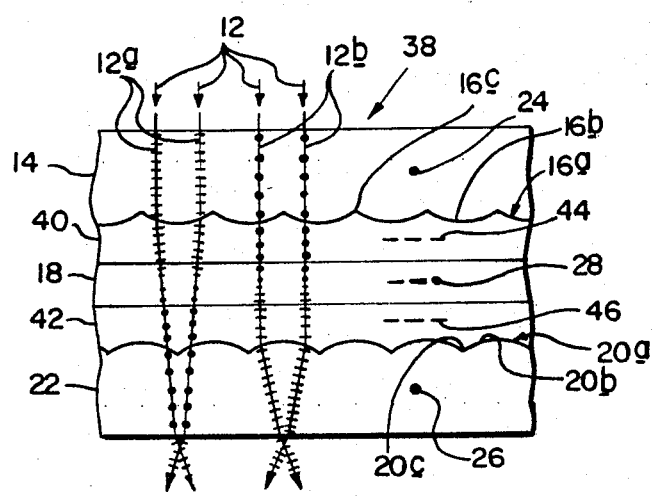

The structure 38 of FIG. 4 is a modification of the symmetrical composite polarizer 10 of FIG. 1 in which the isotropic layers 16 and 20 have been supplanted by the birefringent layers 40 and 42, having optic axes 44 and 46, respectively. For purposes of illustration, it may be assumed that layers 40 and 42 have a lower range of refractive indices than those of 1.5 and 1.7 ascribed to layers 14 and 22, namely, indices of 1.5 and 1.4. It will be noted that the latter are disposed at 90° to the optic axes 24 and 26. The polarizer 38 is, advantageously, thinner than that of FIG. 1. For any given radius of curvature and distance between the vertices of the lenticules, the greater the difference of refractive indices which may exist between successive layers at an interface, the greater the convergence of the ray components undergoing refraction at the interface. It follows that a shorter focal length characteristic of the lenticules and a greater angular aperture are thus provided as well as a smaller image of the filament of a light source producing the incident beams 12. Greater latitude in the direction of the incident light beams 12 and a lesser restriction as to the size of the filament of a light source are, accordingly, permitted.

Assuming the indices of refraction above stated relative to FIG. 4, operation is, in general, as follows. The "E" ray components 12a having an index of 1.7 become associated with the "O" ray component of layer 40, having an index of 1.4, at the interface 16a, the difference of refractive index being .3. Accordingly, the ray components 12a are caused to converge at the lenticular interface 16a. After rotation of their vibration direction in passing through the half-wave retardation layer 18, the azimuth of the ray components 12a is altered and they become associated with the 1.5 indices of layers 42 and 22 and remain undeviated. On the other hand, the "O" ray components 12b, having an index of 1.5, become associated with the "E" ray components having a similar index of layer 40, are, therefore, undeviated at interface 16a, and are transmitted so as to be normally incident upon, and pass straight through, the layers 18 and 42. After rotation of their vibration directions, during transmittal by the half-wave retardation layer 18, the ray components 12b become identified with the lower or 1.4 index component of layer 42 and at the interface 20a with the higher or 1.7 index component of layer 22. Because of the difference of refractive index found at the latter interface, the rays 12b are caused to converge as indicated. The optical characteristics of the elements described are so chosen as to provide focusing of the respective ray components at a focal plane adjacent to the exit face of the composite assembly.

Figure 2:
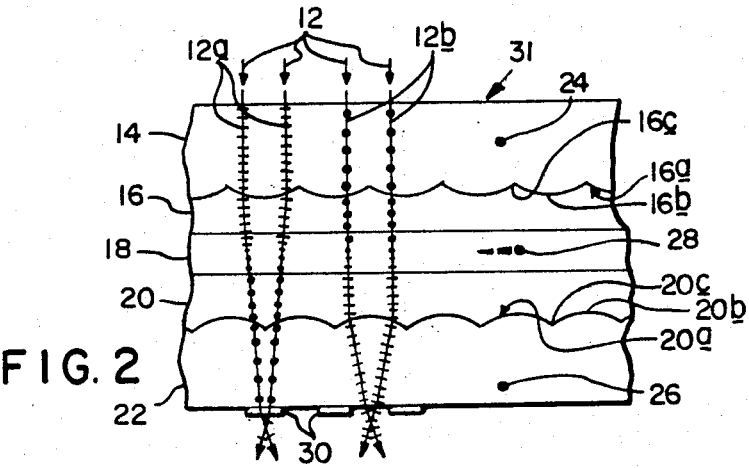
Figure 5:
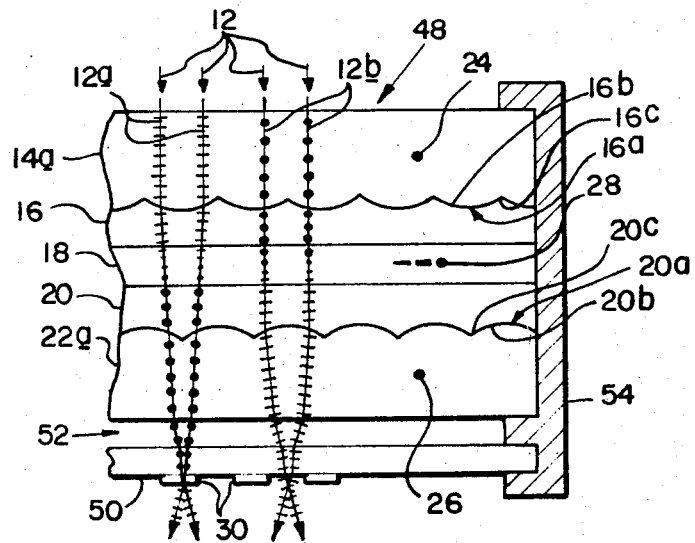

In the modification 48 of FIG. 5, the structure is similar to that of FIG. 2 except that the layers 14 and 22 have been made thinner, as represented by layers 14a and 22a, and the half-wave retardation strips 30 are mounted on a relatively thin transparent plate 50, an air space existing at 52. The respective elements are mounted in a frame 54. The reduced overall thickness is permitted by the reduction of the thickness of the original layers 14 and 22 and the introduction of the air gap 52. It will be understood that collimating means may be included at a location adjacent to the focal points of the respective ray components.

Again referring to FIG. 4, one modification thereof which would entail a generally similar operation involves a higher range of refractive indices, e.g., 1.7 and 1.9, for layers 14 and 22. A lower range, e.g., 1.5 and 1.7 applying to layers 40 and 42. A second modification of the structure of FIG. 4 would include a reversal of the interface shapes 16a and 20a, that is, the lenticulations would face outwardly, and a higher range of refractive indices, e.g., 1.7 and 1.9 for the layers 40 and 42, the layers 14 and 16 retaining the indices indicated in FIG. 4, namely 1.5 and 1.7. In this example, the "E" rays would pass without deviation to the modified interface 20a, at which point they would be convergently refracted and proceed to a focal point. The "O" rays would be refracted at the modified interface 16a and, thereafter, would pass without any substantial further deviation to the focal point. Both selective retardation strips and collimating means of the type described elsewhere may be incorporated with the structure of FIG. 4 and the above-described modifications thereof.

Consistent with obtaining an operational refraction or non-refraction of rays generally similar to those illustrated, the several layers may be formed of substantially any materials having suitable refractive indices, transparency and physical or mechanical properties such as thermal stability, flexibility or adhesion. Thus, for example, the isotropic layers 16 and 20 may be composed of any of such materials as tetrofluoroethylene, vinyl acetate, cellulose acetate butyrate, polyvinyl carbazole, a polystyrene, an acrylic, glass, etc. Layers 14, 22, 14a, 22a, 40 and 42 may be a sodium nitrate crystal plate having indices of refraction of 1.587 and 1.336 or a calcite crystal plate having indices of 1.658 and 1.486.

Additional materials which can conceivably be used in forming the shown birefringent layers comprise cellulose acetate, ethyl cellulose, methyl cellulose, natural crystals of urea or some other minute birefringent particles. While a uniaxial type of birefringent layer is that principally conceived of and preferred, it is possible to employ a biaxial material for the purpose provided that the proper functional relation between the indices of refraction of the several layers is maintained. The indices of refraction of the several layers may further be controlled by predeterminedly altering their moisture or plasticizer content as, for example, the index may be lowered by adding moisture content and, in general, by adding plasticizer. Where bonding substances or subcoats are employed in laminating preformed layers, a material used for such a purpose should have an index of refraction similar to that of one of the layers undergoing bonding to prevent unwanted reflection.

While collimation of the incident beams 12 is not essential to operativeness, this condition is generally or predominantly to be expected in an anti-glare headlamp system and non-collimated diverging entering beams would require a lateral repositioning of the half-wave retardation strips 30 or of any collimating means at the exit surface such as the lenticular means 34 to accommodate to focal points which would differ laterally from those shown. Thus, the lateral locations of focal points and elements located thereat would depend upon whether they were adapted to function relative to collimated or diverging incident light. In the instance of a polarizer adapted to function with diverging incident rays, it may generally be assumed that the locations of elements at the focal points are along theoretical lines from the light source which pass through the centers of the lenticules at a first interface.

The size, radius of curvature and focal length of lenticules, the indices of refraction of the respective layers, etc., are so chosen as to establish a focal plane adjacent to an exit face of each assembly. Where the lenticules have a large radius of curvature, it would be possible to reduce the overall thickness by making each in the form of a Fresnel lens. It is generally to be understood that the optic axes of the half-wave retardation strips are disposed at 45° to the long dimension thereof.

Further referring to general structural considerations, lenticules, where positive, may, for example, be of a spherical, cylindrical or elliptical form, depending upon the optical requirements, and the negative lenticules may be of any chosen fluted or concave contour which serves an intended function. Wherein birefringent layers have been described as positively birefringent, they may be negatively birefringent, assuming a modification of the refractive indices of "E" and "O" rays.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A composite light polarizing device for receiving unpolarized incident light and transmitting a substantial proportion of said light in the form of polarized light through an exit surface thereof comprising:
   a first pair of layers, at least one of which is birefringent and has a given optical axis, said first pair of layers defining a configured first interface which is substantially refractive of a first component of said incident light having a given polarization azimuth, but non-refractive of a second component thereof having a polarization azimuth orthogonal to said given polarization azimuth, said configured first interface refracting said light having said given polarization azimuth toward a plurality of first spaced apart areas of substantial focus located at said exit surface;
   a second pair of layers, at least one of which is birefringent and has an optical axis substantially parallel to said given optical axis, said second pair of layers defining a configured second interface which is substantially refractive of light having said given polarization azimuth, but non-refractive of light having said orthogonal polarization azimuth, said configured second interface refracting light having said given polarization azimuth toward a plurality of second spaced apart areas of substantial focus, at said exit surface, laterally spaced from said first spaced apart areas of substantial focus; and
   half-wave retardation means interposed between said first and said second pairs of layers for rotating said polarization azimuths of said first component and said second component substantially 90° said first component entering said retardation means having said given polarization azimuth and exiting said retardation means having its polarization azimuth rotated substantially 90°, whereby said first component now having said orthogonal polarization azimuth passes through said second interface without additional refraction, said second component entering said retardation means, after passing through said first interface without being refracted, having said orthogonal polarization azimuth and exiting said retardation means, having its polarization azimuth rotated substantially 90°, so as to have said given polarization azimuth, whereby said second component is refracted by said second interface toward said second plurality of spaced apart areas of substantial focus laterally spaced from said first plurality.

2. A composite light polarizing device, as defined in claim 1, including retardation means, positioned adjacent said exit surface, for selectively altering the polarization azimuth of at least one of said components so as to bring light emerging from said exit surface to a common polarization azimuth.

3. A composite light polarizing device, as defined in claim 1, including means for collimating light emerging from said exit surface.

4. A composite light polarizing device adapted to transmit, in the form of polarized light, a relatively large portion of the essentially unpolarized light which is incident thereupon, comprising, in order to transmittal of said incident light:
   a birefrigent first layer having an entrance surface, an optic axis parallel to said surface disposed in a given direction, and a lenticulated second surface;
   a second layer having a lenticulated first surface facing and conforming to said lenticulated surface of said birefrigent first layer, a refractive index substantially identical to one refractive index of said birefrigent first layer and a planar second surface;
   a half-wave retardation third layer having planar surfaces and an optic axis parallel thereto disposed at an acute angle relative to said optic axis of said birefringent first layer;
   a fourth layer having a planar first surface, refractive indices identical to that of said second layer, and a lenticulated second surface; and
   said lenticules of said first and second lenticulated interfaces being arranged in laterally offset relation such that the lenticule vertices of said first interface are aligned with the interstices between adjoining lenticules of said second interface, the doubly-refractive property of said first birefringent layer resolving each entering beam of said incident light into a first component, having a given polarization azimuth, which is convergently refracted at said first interface toward a first plurality of space apart foci adjacent to said exit surface and a second component, having a polarization azimuth orthogonal to that of said given polarization azimuth, which is not refracted at said first interface, said second component being convergently refracted, after rotation of its polarization azimuth substantially 90° by said half-wave retardation layer, at said second interface, toward a second plurality of spaced apart foci adjacent to said exit surface and laterally spaced from said first foci formed by said first component, said first component, after rotation of its polarization azimuth substantially 90° by said half-wave retardation layer, passing through said second interface without additional refraction.

5. A composite light polarizing device, as defined in claim 4, wherein said lenticules of said first and second interfaces are of an elongated generally cylindrical form.

6. A composite light polarizing device, as defined in claim 5, wherein said optic axes of said birefringent layers and the lengthwise axis of each of said lenticules are substantially parallel.

7. A composite light polarizing device, as defined in claim 4, wherein the lenticules of said first and second lenticulated interfaces are of generally similar size and curvature.

8. A composite light polarizing device, as defined in claim 4, including selective retardation means positioned adjacent said exit surface for selectively altering the polarization azimuth of at least one of said components so as to bring light emerging from said exit surface to a common polarization azimuth.

9. A composite light polarizing device, as defined in claim 8, including means, positioned adjacent said retardation means, for collimating said light having said common polarization azimuth.

10. A composite light polarizing device, as defined in claim 4, wherein at least one of said birefrigent layers is composed of polyethylene terephthalate which has been molecularly oriented in a given direction.

References Cited

UNITED STATES PATENTS

| | | | |
|---|---|---|---|
| 2,180,114 | 11/1939 | Land | 350—157 |
| 2,420,279 | 5/1947 | Young | 350—157 |
| 2,270,535 | 1/1942 | Land et al. | 350—157 |
| 3,060,808 | 10/1962 | Koester | 350—157 |
| 3,213,753 | 10/1965 | Rogers | 350—157 |
| 3,218,926 | 11/1965 | Boone | 350—158 |
| 3,274,881 | 9/1966 | Saver | 350—157 |
| 2,152,297 | 3/1939 | Wilson | 30—167 X |
| 2,700,919 | 2/1953 | Boone | 350—157 |
| 3,329,474 | 7/1967 | Harris et al. | 350—157 |

DAVID SCHONBERG, Primary Examiner

P. R. MILLER, Assistant Examiner

U.S. Cl. X.R.

350—147, 152, 167

UNITED STATES PATENT OFFICE
CERTIFICATE OF CORRECTION

Patent No. 3,522,985      Dated August 4, 1970

Inventor(s) Howard G. Rogers

It is certified that error appears in the above-identified patent and that said Letters Patent are hereby corrected as shown below:

Column 3, line 9, (appln., page 4, line 4) after "168,398," insert --filed Jan. 24, 1962,--;

Column 3, beginning at line 10, (appln., page 4, line 12) after "26,506" delete "filed Jan. 24, 1962";

Column 4, line 43, (appln., page 7, line 8) "fiuration" should be --figuration--;

Column 5, line 67, (appln., page 10, line 1) "refrac-" should be --refractive--;

Column 8, line 30, (appln., claim 22, line 4) "to" should be --of--;

Column 8, line 32, (appln., claim 22, line 6) "birefrigent" should be --birefringent--;

Column 8, line 37, (appln., claim 22, line 11) "birefrigent" should be --birefringent--;

Column 8, line 38, (appln., claim 22, line 12) "birefrigent" should be --birefringent--;

Column 9, line 18, (appln., claim 28, line 2) "birefrigent" should be --birefringent--.

Signed and sealed this 14th day of March 1972.

(SEAL)
Attest:

EDWARD M. FLETCHER, JR.       ROBERT GOTTSCHALK
Attesting Officer      Commissioner of Patents